H. C. HART.
SHAFT COUPLING.
APPLICATION FILED MAR. 20, 1913.
1,140,978.
Patented May 25, 1915.
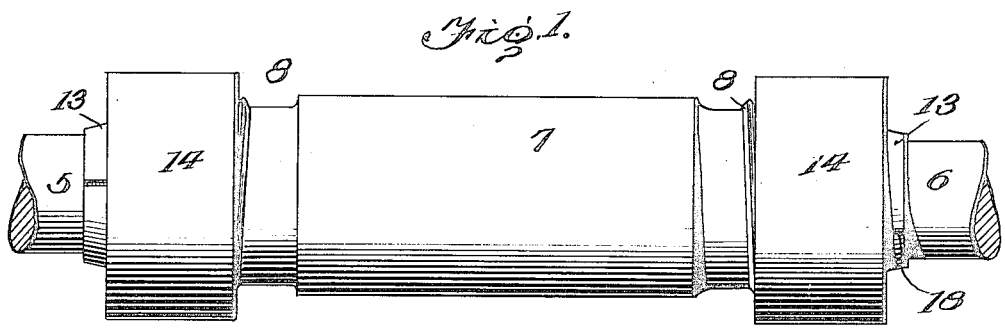
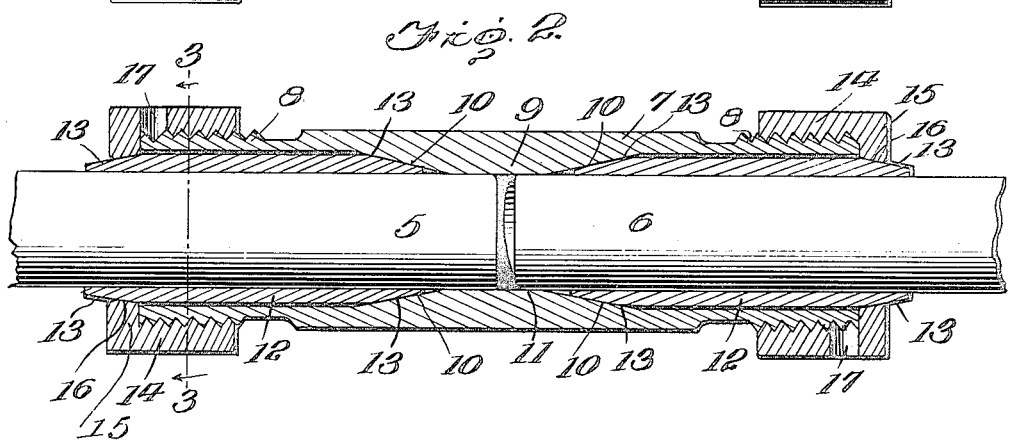
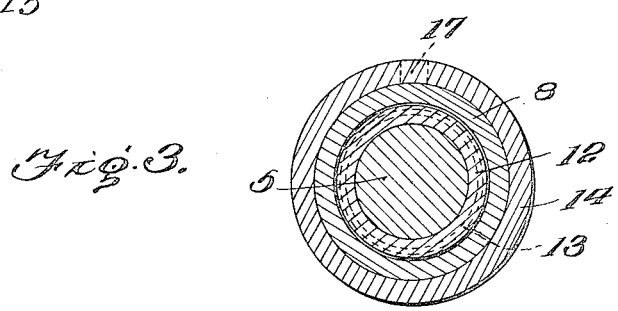
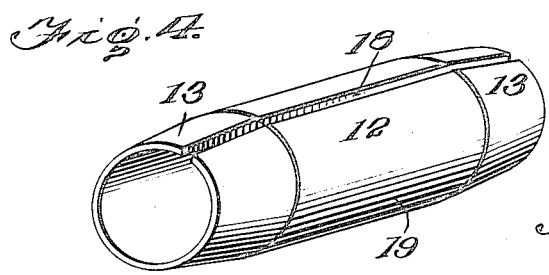
Witnesses
Floyd R. Cornwall.
Dudley Browne
Inventor
H. C. Hart.
By
Attorney

UNITED STATES PATENT OFFICE.

HUBERT C. HART, OF UNIONVILLE, CONNECTICUT.

SHAFT-COUPLING.

1,140,978.  Specification of Letters Patent.  Patented May 25, 1915.

Application filed March 20, 1913. Serial No. 755,715.

*To all whom it may concern:*

Be it known that I, HUBERT C. HART, a citizen of the United States, residing at Unionville, in the county of Hartford and State of Connecticut, have invented certain new and useful Improvements in Shaft-Couplings; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to shaft couplings, and more particularly to that class of shaft couplings adapted to connect the abutting ends of separate shafts by means of tapered bushings and screw-threaded collars operating therewith.

The object of the invention is to provide a shaft coupling capable of exerting a great pressure upon the shafts held thereby to prevent any danger of the shafts becoming loose.

A further object of the invention is to provide a shaft coupling which shall be compact, strong, and of the fewest possible parts.

With these and other objects in view the invention consists in the combination and relation of parts as hereinafter described and more particularly pointed out in the appended claim.

Referring to the drawings, wherein similar reference numerals indicate similar parts wherever used, Figure 1 is a side elevation of the device. Fig. 2 is a longitudinal sectional view of the device. Fig. 3 is a section on line 3—3 of Fig. 2. Fig. 4 is a perspective view of one of the tapered bushings.

5 and 6 are the two shafts to be coupled by means of the device.

An annular member 7 is provided with similar screw threaded end portions 8—8. Upon the interior of the member 7, is a shoulder 9, provided with tapering sides 10. The internal diameter of the shoulder forms a sliding fit for the shaft ends as at 11.

Adjacent the tapered ends 10, of the interior shoulder 9, the annular member 8, is slightly hollowed out to allow the insertion of longitudinally split bushings or removable clamping members 12—12, Fig. 4. These bushings are provided with tapering portions 13 at each end thereof, and a plain cylindrical portion 19, intermediate the tapered ends. These tapered bushings are inserted within the annular member 7, until they abut against the tapered edges 10, of the interior shoulder 9, when the tapered portions 13, engage the tapered edges 10. While the parts are in the said position, screw threaded annular collars 14, are fitted to the portions 8, of the member 7. Upon these collars are depending outward flanges 15, provided with inwardly tapering surfaces 16. These tapered surfaces 16, engage the outer tapered portion 13, of the bushing 12, at the outermost part of the tapered portion. The shafts 5 and 6, to be coupled, are now inserted. By means of suitable tools inserted in sockets 17, for this purpose, the collars 14 are rotated. The tapered surface 16, slides inwardly upon the tapered surface 13, thus forcing the bushing tightly against the interior shoulder 9. At the same time the bushing 12, is being contracted, due to the longitudinal slot 18, therein in the following manner. As the collar 14, is screwed inwardly upon the portion 8, the tapered portion 16, bears upon the portion 13 of the bushing and rides thereupon. Further pressure being applied, the slot 18, begins to close, thus lessening the diameter of the bushing and clamping it tightly against the interior tapered edge 10 and also around the shaft passing therethrough, thus forming a tight fit for the shaft, which is thus held against any movement.

Variation of the details as borne out may be accomplished without departing from the spirit of my invention.

I claim:—

A shaft coupling comprising a central elongated cylindrical member exteriorly threaded at both ends, and provided with a central bore, the bore at opposite ends of the member being cylindrical, the inner ends of the cylindrical portions of the bore being inwardly tapered and a central reduced cylindrical portion of the bore being formed between said inwardly tapered portions, the inner ends of the coupled shaft sections fitting snugly in the reduced central cylindrical portion of the bore, split bushings fitted in the cylindrical end portions of the bore, each bushing comprising a central elongated cylindrical portion and oppositely tapered ends, the inner tapered ends of the bushings engaging the inwardly tapered portions of the bores, and the outer tapered ends of the bushings extending beyond the ends of the central cylindrical member, the diameter of the bore of the opposite cylindrical portions between the tapered portions and the ends of the cylindrical member being greater than the diameter of the cylindrical portions of the bushings between the tapered ends, and clamping nuts engaging the exterior threads on the central member, each of said nuts having an inturned end flange which is beveled on its inner edge surface, the beveled edge surfaces of the nuts engaging the outer tapered ends of the bushings to force same inwardly against the inner tapered portions of the central member and clamp said bushings to the coupled shaft sections, the spaces between the cylindrical member and the bushings causing the latter to yield and turn the ends of said bushings to grip the shaft.

In testimony whereof I have signed my name to this specification in the presence of two subscribing witnesses.

HUBERT C. HART.

Witnesses:
SYLVESTER LEEDS,
JAS. H. MASON.